United States Patent

Matsui et al.

[11] 4,202,273
[45] May 13, 1980

[54] TRAVELLING OBJECT CONTROL SYSTEM UTILIZING POWER CONTROL

[75] Inventors: Kazumi Matsui, Yokohama; Takashi Takasue, Kawaguchi; Masami Iwasaki, Tokyo, all of Japan

[73] Assignee: The Furukawa Electric Co., Ltd., Tokyo, Japan

[21] Appl. No.: 832,066

[22] Filed: Sep. 9, 1977

[30] Foreign Application Priority Data

Sep. 13, 1976 [JP] Japan .................. 51-108900
Nov. 2, 1976 [JP] Japan .................. 51-131284
May 10, 1977 [JP] Japan .................. 52-52685
May 10, 1977 [JP] Japan .................. 52-52686

[51] Int. Cl.² ........................ B60M 1/10
[52] U.S. Cl. ................. 104/298; 246/187 C
[58] Field of Search .......... 104/153, 152, 148 R; 246/187 C, 34 R, 40, 182 B; 318/376; 191/2, 6

[56] References Cited

FOREIGN PATENT DOCUMENTS 61106 9/1913 Austria ..................... 104/153
509484 10/1976 U.S.S.R. .................. 246/187 C

*Primary Examiner*—Trygve M. Blix
*Assistant Examiner*—Reinhard J. Eisenzopf
*Attorney, Agent, or Firm*—Haseltine, Lake & Waters

[57] ABSTRACT

A control system for automatic operation of travelling objects through a power supply system without using any signal communication systems. Either a DC power source or three-phase AC power source is utilized as a power source. With the system employing a DC power source, three trolley wires are installed, one a negative and two positive. Each of the positive wires is divided and insulated into sections of a predetermined length; the positive feeding trolley wires in each section is always supplied with the DC power, and the power to the other positive feeding trolley wire is switched on and off depending on the movement of travelling objects. Each travelling object is supplied with power by the three trolley wires has a DC motor, and when one of the positive wires has no voltage, this is detected and the braking is effected. The travelling object entering a station is automatically decelerated and stopped. When employing a three-phase AC power source, four trolley wires are installed, of which one is a neutral trolley wire and the remaining three trolley wires are with phases of AC power. Each of these three AC feeding trolley wires is divided and insulated into sections of a predetermined length, one of the three trolley wires is always supplied with the phase power, and power to the other two is switched on and off responsive to movement of the travelling objects, which travelling objects are equipped with an induction motor having star connected field coils and as power to the two AC feeding trolley wires is switched off, the unbalance current in the field coil flows to the neutral trolley wire causing braking.

8 Claims, 7 Drawing Figures

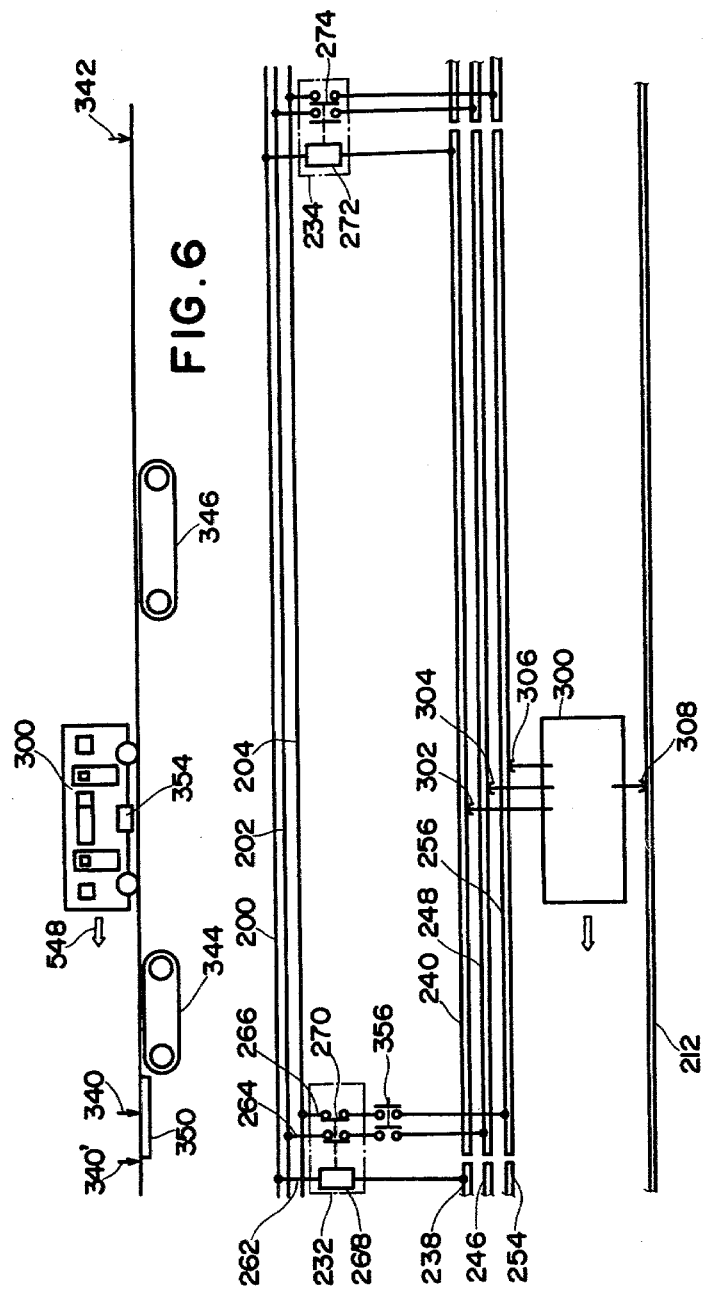

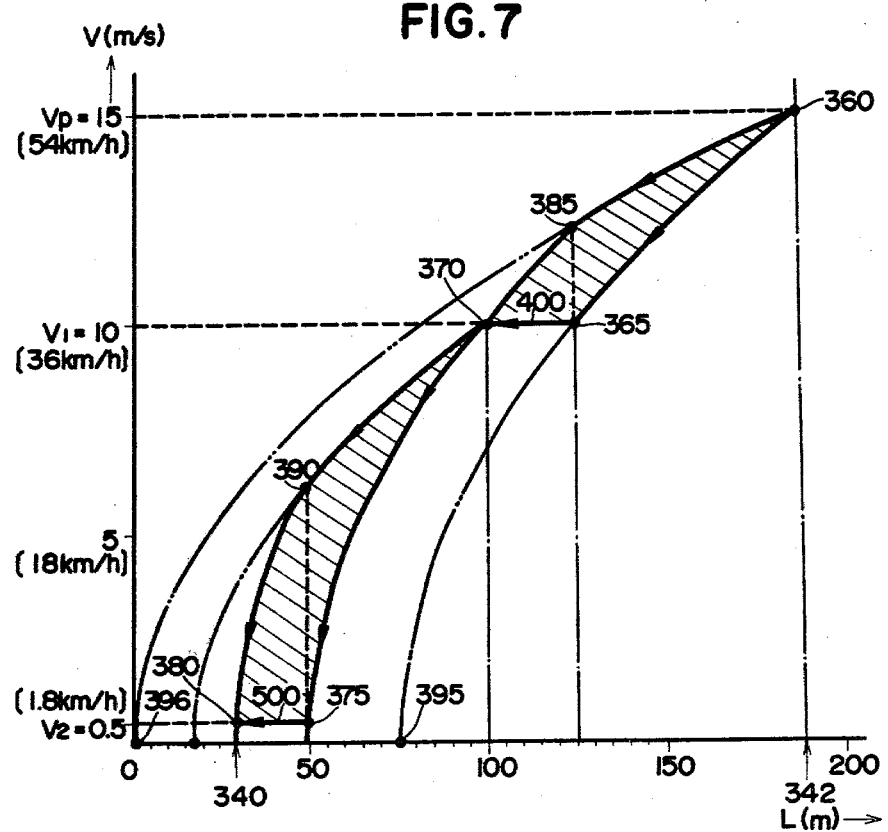

TRAVELLING OBJECT CONTROL SYSTEM UTILIZING POWER CONTROL

BACKGROUND OF THE INVENTION

The present invention relates to an improved block control system for travelling objects utilizing power control, and more particularly the invention relates to an improved block control system so designed that the automatic operation of vehicles is effected without resorting to controls by conventional or specially designed communication and signal systems but by simply through the power control of a feeder circuit which supplies power to the vehicle.

The systems of automatic vehicle operation which have heretofore been put to practical use are generally of the type in which the automatic operation of vehicles is accomplished by supplying to the vehicles operation signals from an operation control equipment through vehicle operation controlling signal circuits which are provided in addition to the power feeding circuit. Thus, this type of automatic vehicle operation system requires, in addition to the power equipment system for vehicles, automatic operation control circuits, signal communication equipment, operation controlling equipment, etc., thus requiring huge equipment costs and much labor and time for maintenance and administration of these equipments, and moreover in the event that the automatic vehicle operation is rendered inoperative due to breakdown of vehicles or control systems etc., much time is needed for the restoration and thus it is very expensive to maintain continuously the fully automatic vehicle operation. Further, in the case of a loop line used as an urban railway for intermediate transit vehicles, it is still difficult to incorporate the conventional automatic vehicle operation system and realize its full practical use due to the huge equipment cost and much labors required for ensuring the required reliability.

SUMMARY OF THE INVENTION

With a view to overcoming the deficiencies and disadvantages of the prior art automatic operation of travelling objects employing a signal communication equipment, operation control equipment, etc., the present invention provides a control system of travelling objects which is designed to accomplish the automatic operation of travelling objects, e.g., electric cars only through the power control of a feeder circuit which supplies driving power to the travelling objects.

It is therefore an object of the present invention to provide a control system for travelling objects which controls travelling objects only through the power control of DC constant voltage feeding or three-phase AC feeding.

It is another object of the invention to provide a control system for controlling travelling objects through power control, including a feeder circuit in which a section controller is provided in each of the block sections, in such a manner that no voltage is applied to the trolley wire of the block section following, in the direction of movement of travelling objects, the section where a travelling object is present.

It is still another object of the invention to provide a control system for controlling travelling objects through power control, including a feeder circuit in which is provided in each of the block sections a section controller which is capable of controlling in such a manner that no voltage is applied to the trolley wire of the block section following, in the direction of movement of travelling objects, the section where a travelling object is present, and at the same time the trolley wire of the block section following the no-voltage section is supplied with power at a lower voltage to slow down the travelling object which is present therein.

It is still another object of the invention to provide a control system for controlling travelling objects through power control wherein each of the travelling objects includes a motor circuit employing a DC motor as a driving source whereby the dynamic braking is accomplished when a travelling object enter a no-voltage trolley wire section, and the travelling object is caused to proceed at reduced speed upon entering a lower voltage trolley wire section.

It is still another object of the invention to provide a control system for controlling the operation of travelling objects through power control which is designed to automatically control travelling objects through power control of three-phase AC feeding by utilizing various advantages and features of a three-phase induction motor used as the driving source of each travelling object.

It is still another object of the invention to provide a control system for controlling travelling object through power control wherein the three-phase AC feeding is controlled in such a manner that the dynamic braking is effected by utilizing the unbalanced field current produced in the three-phase induction motor of a travelling object in response to the removal of the voltage on the two trolley wires of the section following, in the direction of movement of travelling objects, the section where the travelling object is present.

It is still another object of the invention to provide a control system for controlling travelling objects through power control wherein the phase current flowing to the neutral trolley wire in response to the entry of a travelling object into a no-voltage trolley wire section, is utilized to energize an electromagnet which in turn effects the magnetic braking in cooperation with a magnetic plate or electrically conductive plate.

It is still another object of the invention to provide a control system for controlling the operation of travelling objects through power control which is capable of stopping a travelling object at the desired position by utilizing magnetic belt means adapted to effect the synchronous deceleration of a travelling object by utilizing the magnetic force produced between the magnetic belt means and the magnet means on the travelling object.

The above and other objects, features and advantages of the present invention will be fully understood by considering the following detailed description taken in conjunction with the accompanying drawings.

BRIEF DESCRIPTION OF THE DRAWINGS

FIG. 5 is a schematic diagram showing the ground equipments and travelling object equipment used in another embodiment of the invention designed to decelerate and stop a travelling object at a fixed point through the power control of three-phase AC feeding.

FIG. 6 is a circuit diagram showing a three-phase AC feeder circuit used for decelerating and stopping at a fixed position a travelling object, which is illustrated in positionally corresponding relationship with FIG. 4.

FIG. 7 is a graph showing the speed curve of the travelling object decelerated and stopped by the embodiment of FIGS. 4 and 5 which is designed for fixed position stop control.

DESCRIPTION OF THE PREFERRED EMBODIMENTS

Figure 1:
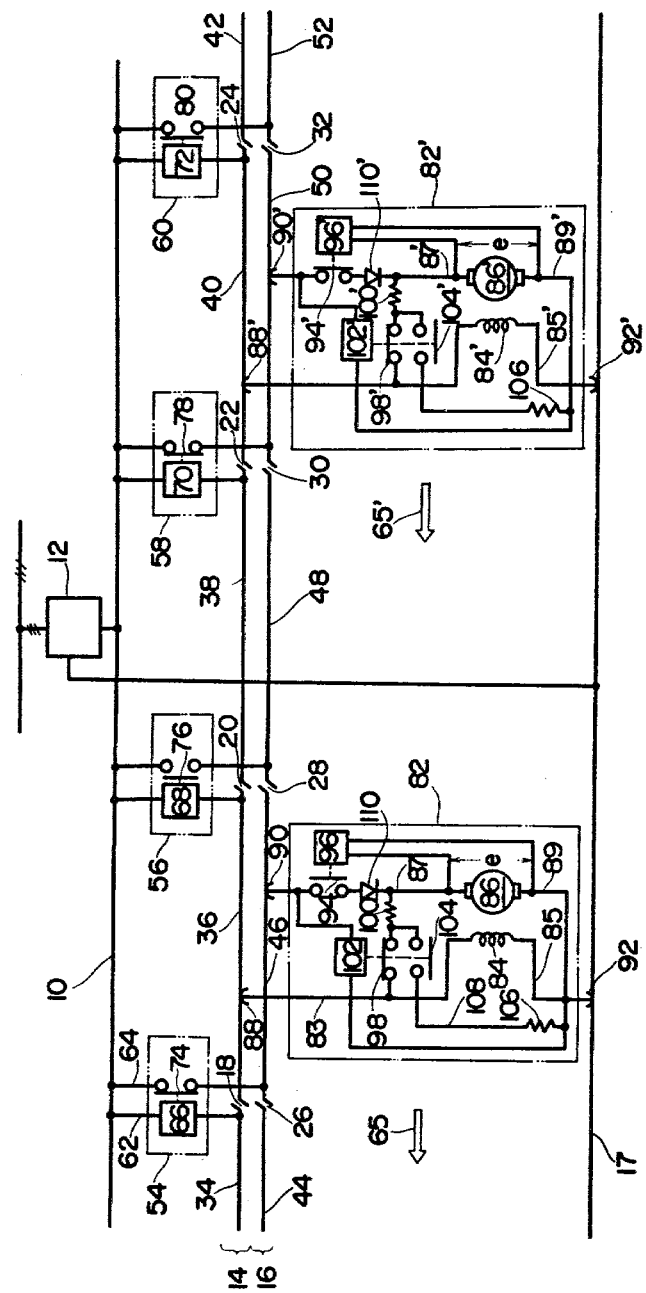
FIG. 1 is a circuit diagram showing the feeder circuit and travelling object motor circuits used in an embodiment of the invention designed to effect the power control of DC constant voltage feeding.

Referring to FIG. 1, the construction of the feeder circuit used in one embodiment will be described first. A positive feeder line 10 is installed along a track, and connected to the positive feeder line 10 is an outgoing line from a DC constant voltage substation 12 which receives a three-phase AC power and accomplishes constant voltage feeding. First and second trolley wires 14 and 16 are installed along the track, and the first and second trolley wires 14 and 16 are provided with suitable sectioning devices, e.g., air sections 18, 20, 22, 24, 26, 28, 30 and 32 which are arranged at intervals of a predetermined block section, thus dividing the trolley wires 14 and 16 into trolley wire sections 34, 36, 38, 40, 42 and 44, 46, 48, 50 and 52 which define a plurality of block sections. In this embodiment, the first trolley wire 14 is a trolley wire which always supplies at a constant voltage vehicle loads, e.g., the field systems of vehicle motors, and the second trolley wire 16 is one which is subjected to feeding control by the switching on and off of the constant voltage to supply at the constant voltage the armature coils of the vehicle motors.

To provide this feeding control, section controllers 54, 56, 58 and 60, one for each block section, are provided between the positive feeder line 10 and the first and second trolley wires 14 and 16. Taking the section controller 54 as an example, the positive feeder line 10 is connected to the trolley wire 34 by a branch line 62, and a branch line 64 connects the positive feeder line 10 to the trolley wire 46. In other words, assuming that the direction of movement of travelling oblect shown by an arrow 65 corresponds to the up-line and the opposit direction corresponds to the down-line, with the air sections 18 and 26 providing bounds, the branch line 62 is connected to the up-line side trolley wire 34 and the branch line 64 is connected to the down-line side trolley wire 46. A current relay coil 66 is inserted and connected in the branch line 62, and the current relay coil 66 is so designed that the coil is energized when the feeder current flows from the trolley wire 34 to the armature coil of the motor of a travelling object, while the coil is deenergized when there is no flow of the feeder current. However, the trolley wire 34 is so arranged that the DC constant voltage from the positive feeder line 10 is always applied to the trolley wire 34 irrespective of the presence or absence of a travelling object. On the other hand, normally closed contacts 74 operated by the current relay coil 66 are inserted and connected in the branch line 64. The normally closed contacts 74 are arranged so that when the current relay coil 66 is deenergized they are closed to apply the constant voltage from the positive feeder line 10 to the trolley wire 46, whereas when the current relay coil 66 is energized they are opened to apply no voltage to the trolley wire 46. In the absence of current the contacts 74 are opened so that current is not produced at the contacts, and the contact life is maintained.

In the other section controllers 56, 58 and 60, the similar circuit connections as in the section controller 54 have current relay coils 68, 70 and 72 and normally closed contacts 76, 78 and 80 which are adapted to be operated by the former.

Next, the motor circuits of travelling objects 82 and 82' whose operation is to be controlled by the above-described feeder system, will be described with reference to the travelling object 82.

The travelling object 82 employs a DC motor as its driving power source, and the DC motor is represented by a field coil 84 constituting the stator and an armature coil 86 constituting the rotor. The travelling object 82 includes three current collectors consisting of a current collector 88 for collecting the current from the first trolley wire 14, current collector 90 for collecting the current from the second trolley wire 16 and current collector 92 for a negative feeder line 17 employing the rail or trolley wire. The field coil 84 of the DC motor is connected between the current collectors 88 and 92 by connecting lines 83 and 85, and the armature coil 86 is connected between the current collectors 90 and 92 by connecting lines 87 and 89. Since the section controller 56 always applies the constant voltage to the trolley wire 36, the field coil 84 is always subjected to the constant voltage feeding and the resulting feeding current flows in the coil. Consequently, the current relay coil 68 of the section controller 56 is energized so that the normally closed contacts 76 are opened and no voltage is applied to the trolley wire 48.

Normally open contacts 94 operated by a voltage relay coil 96 are connected in series with the armature coil 86 of the travelling object 82, and the normally open contacts 94 are opened and closed by the voltage relay coil 96. The voltage relay coil 96 responds by detecting the speed electromotive force (e) of the armature coil 86. In other words, when the speed of the travelling object 82 reaches a predetermined speed, the voltage relay coil 96 is energized by the speed electromotive force (e) generated at that speed, so that the normally open contacts 94 are closed and the constant voltage from the trolley wire 46 is supplied to the armature coil 86, thus causing the travelling object to come into a constant speed operation on the constant voltage power supply from the positive feeder line 10.

The connecting lines 83 and 87 are relatively connected with each other through normally open contacts 98 operated by a voltage relay coil 102 and a resistor 100, and the normally open contacts 98 are opened and closed by the voltage relay coil 102. The voltage relay coil 102 is deenergized when no voltage is applied to the second trolley wire 16, and it is energized in response to the application of the voltage to the second trolley wire 16. In the illustration, the voltage is applied to the trolley wire 46 in response to the closing of the normally closed contacts 74 in the section controller 54, so that the voltage relay coil 102 is energized and the contacts 98 are closed. The resistor 100 provides a voltage drop so that a lower voltage is applied to the armature coil 86 until the normally open contacts 94 are closed, that is, until the speed of the travelling object exceeds the predetermined value.

Extended from the contacts 98 side of the resistor 100 is connecting line 108 connecting in series normally closed contacts 104 operated by the voltage relay coil 102 and a resistor 106. When the voltage relay coil 102 is deenergized, the normally closed contacts 104 are closed so that a closed loop comprising the armature coil 86, the resistor 100, the contacts 104 and the resistor 106 is formed, and the speed electromotive force (e) of the armature coil 86 is dissipated by the resistors 100 and 106, thus accomplishing the dynamic braking. This dynamic braking is effected when the second trolley wire 16 is switched to the no-voltage condition during the running of the travelling object 82. A diode 110 in the connecting line 87 is provided to block reverse current.

The above-described motor circuit of a travelling object is identical with that of the following travelling object 82' whose component parts are designated by the same reference numerals but with a prime.

With the construction described above, the operation of the embodiment shown in FIG. 1 is as follows.

Assume now that the travelling object 82 departs from the section between the section controller 54 and 56, and no other travelling object is present in the preceding section of the section controller 54. Under these conditions, no feeding current is flowing in the current relay coil 66 of the section controller 54, so that the current relay coil 66 is not energized and the contacts 74 are closed, thus supplying the constant voltage current from the DC constant voltage substation 12 to the trolley wire 46.

The starting of the travelling object 82 is effected by suitable means provided independently of the feeder system shown in FIG. 1, that is, a separate normally open switch (not shown) is inserted in the branch line 64 so as to be remotely turned on or alternately a normally open switch (not shown) is inserted in the armature coil 86 of the travelling object 82 so as to be remotely turned on. When the constant voltage feeding to the trolley wire 46 is initiated in this way, the voltage relay coil 102 is first energized by the constant voltage feeding voltage on the armature side of the trolley wire 46, thus closing the contacts 98 and opening the contacts 104 as shown in FIG. 1. Consequently, the armature coil 86 receives the current from the connecting line 83 through the current limiting resistor 100 and the travelling object 82 is started.

When the speed of the travelling object increases so that the speed electromotive force (e) of the armature coil 86 reaches a prescribed value which may for example be greater than about half the speed electromotive force produced by the feeding voltage during the cruising speed operation, the voltage relay coil 96 is energized and the contacts 94 are closed. Consequently, the armature coil 86 receives through the trolley wire 46 the normal constant voltage feeding current collected by the current collector 90. Thus, by suitably designing the current limiting resistor 100 and the operating voltage of the potential relay coil 96 by the speed electromotive force (e), the operations of a travelling object in any block section ranging from the starting to the point at which the travelling object comes into a cruising speed operation can be smoothly effected only through the power control.

Next, with the travelling object 82 being present at rest or running in the section between the section controllers 54 and 56 in FIG. 1, the operation of the following travelling object 82' which occurs when it enters the immediately following section between the section controllers 56 and 58, will now be described.

When the travelling objects 82' is entering, the constant voltage from the positive feeder line 10 is being applied to the trolley wire 38 through the branch line of the section controller 58. However, no voltage is being applied to the trolley wire 48. The reason is that the feeding current to the travelling object 82 flows to the current relay coil 68 of the section controller 56 so that the current relay coil 68 is energized and the contacts 76 are opened by the energization of the current relay coil 68.

Consequently, when the travelling object 82' passes the air sections 22 and 30 and enters the section of the trolley wires 38 and 48, a voltage relay coil 102' is deenergized by detecting the nonexistence of voltage on the trolley wire 48, so that contacts 98' are opened and contacts 104' are closed. The closing of the contacts 104' results in a closed loop comprising an armature coil 86', resistor 100', contacts 104' and resistor 106', so that the speed electromotive force (e) of the armature coil 86' is dissipated by the resistors 100' and 106' as the load and the dynamic braking of the travelling object 82' is effected, thus decelerating and if this condition continues the travelling object 82' comes to stop.

When the preceding travelling object 82 passes the section controllers 54 and 56 and moves into the preceding section while the travelling object 82' is being braked and decelerated or after the travelling object 82' has been stopped, the current relay coil 68 of the section controller 56 is deenergized and the contacts 76 are closed, thus applying the constant voltage to the trolley wire 48. In response to the application of the voltage to the trolley wire 48, the voltage relay coil 102' of the travelling object 82' is energized and the contacts 104' are opened. Consequently, the dynamic braking is released so that if the travelling object 82' is at rest, it is started and accelerated into the cruising speed operation, whereas if the travelling object 82' is at the deceleration operation it is accelerated and brought into the cruising speed operation.

It will thus be seen that in accordance with the travelling object control system according to the invention, in response to the movement of a travelling object, no voltage is applied to one of the trolley wires for the block section following that section where the travelling object is present, thus decelerating or stopping the following travelling object and thereby accomplishing the block control of a plurality of successively moving travelling objects only through the power control.

Figure 2:
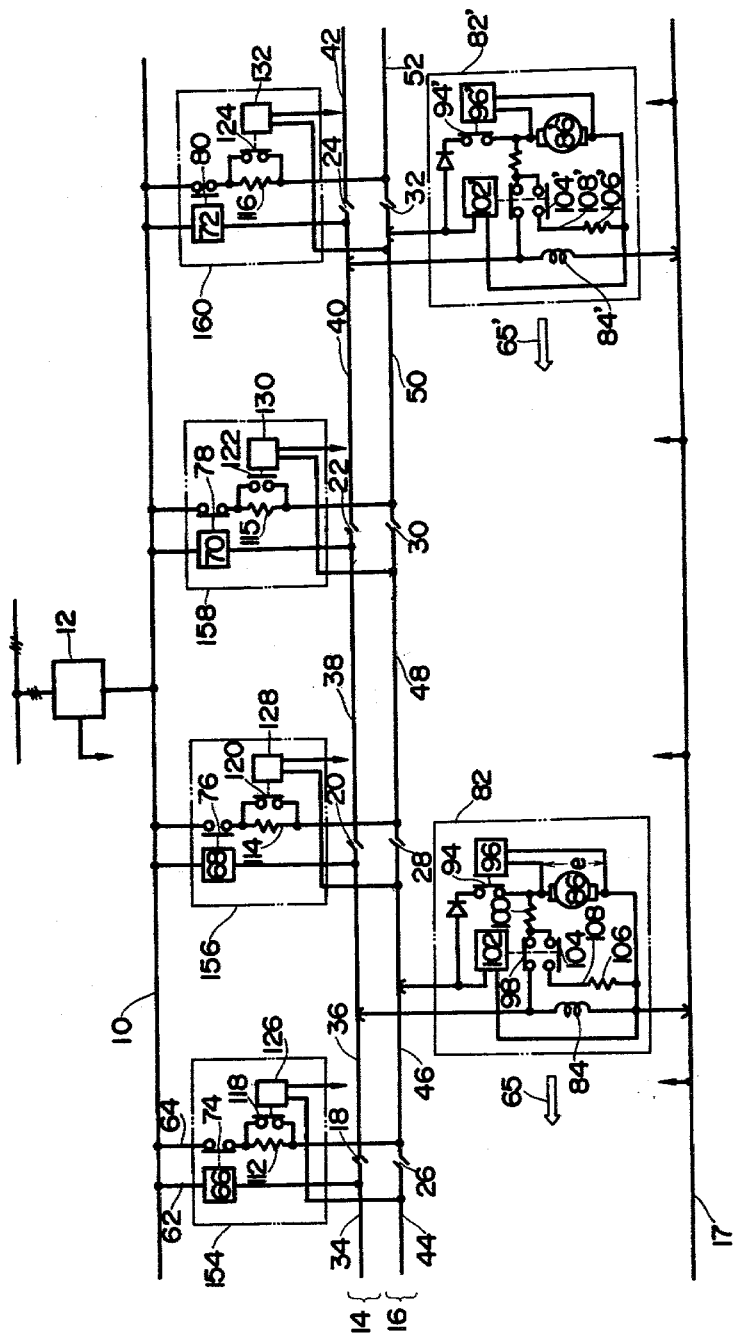
FIG. 2 is a circuit diagram showing another feeder circuit for the power control of DC control voltage feeding including section controllers designed to feed the power to a travelling object at a lower voltage to slow down the travelling object.

Referring now to FIG. 2, there is illustrated another embodiment of the travelling object control system through power control, in which a slow speed section is provided to succeed a deceleration and stopping section provided in the rear of a preceding travelling object to thereby improve the operating safety of the following travelling object which is automatically operated in accordance with the movement of the preceding travelling object.

While the travelling object control system shown in FIG. 1 is well suited for controlling the operation of travelling objects operated at low speeds by virtue of the fact that the following travelling object is rapidly decelerated by the dynamic braking upon entering the block section to which no power is supplied and that the dynamic braking is released and the following travelling object is accelerated by the constant voltage feeding as soon as the preceding travelling object passes through the section just preceding the section where the following travelling object is present, this control system is insufficient for controlling travelling objects operated at high speeds. In other words, where the running speed of travelling objects is high or the weight of travelling objects is large, it is necessary to take into consideration the fact that there is the danger of failing to stop the following travelling object within the deceleration and stopping section and thus giving a feeling of the following travelling object to proceed into the section occupied by the preceding travelling object and collide therewith from behind and that particularly when the preceding travelling object is stopped suddenly due to an accident or the like there is the danger of the following travelling object colliding with the preceding travelling object from behind.

These deficiencies are overcome by the control system shown in FIG. 2. The control system of FIG. 2 differs from the embodiment of FIG. 1 in that resistors 112, 114, 115 and 116 are respectively connected in series with the normally closed contacts 74, 76, 78 and 80 of section controllers 154, 156, 158 and 160, that normally open contacts 118, 120, 122 and 124 are respectively connected in parallel with the resistors 112, 114, 115 and 116 and that voltage relay coils 126, 128, 130 and 132 are provided for respectively opening and closing the normally open contacts 118, 120, 122 and 124. The remaining feeder circuit and travelling object motor circuits are the same as in FIG. 1 and are designated by the same numerals.

Taking the case of the section controller 154, the resistor 112 inserted in the branch line 64 and connected in series with the normally closed contacts 74 serves as a voltage dropping resistor so that when the feeding current by the constant voltage feeding is supplied to the trolley wire 46 from the positive feeder line 10 in response to the closing of the contacts 74, the resistor 112 produces a voltage drop to reduce the feeding voltage of the trolley wire 46 to a lower voltage. Thus, in response to the voltage drop by the resistor 112, the load current to the armature coil of a travelling object is decreased and thus the speed of the travelling object is controlled at the desired slow speed. The value of the resistor 112 is determined suitably in accordance with the desired slow speed of travelling objects.

The normally open contacts 118 connected in parallel with the resistor 112 are so designed that when they are closed in response to the energization of the voltage relay coil 126, the DC constant voltage from the positive feeder line 10 is directly applied to the trolley wire 46. When the voltage relay coil 126 is deenergized, the contacts 118 are opened and the low voltage feeding for slow speed operation is effected through the resistor 112. The voltage relay coil 126 is connected between the trolley wire 44 of the preceding section separated by the air section 26 and the negative feeder line 17 which is disposed opposite to it as shown by the arrows, so that when either the constant voltage feeding current or low voltage feeding current is supplied to the trolley wire 44, the voltage relay coil 126 is energized and the contact 118 is closed, whereas when no voltage is applied to the trolley wire 44, the voltage relay coil 126 is deenergized and the contacts 118 are opened. In the illustrated conditions, the constant voltage is applied to the trolley wire 44 so that the potential relay coil 126 is energized and the contacts 118 are closed.

The above-described circuit connections of the section controller 154 are identical with those of the remaining section controllers 156, 158 and 160.

In the following discussion of the operation of the control system shown in FIG. 2, let it be assumed that no other travelling objects are present in at least two preceding block sections in the direction of the movement of the travelling object 82 indicated by the arrow 65. Consequently, the current relay coil 66 of the section controller 154 is deenergized thus closing the contacts 74 and at same time the potential relay coil 126 is energized by the voltage applied to the trolley wire 44 thus closing the contacts 118. As a result, the DC constant voltage is applied from the positive feeder line 10 to the trolley wire 46 and also the DC constant voltage is applied to the trolley wire 36 through the branch line from the section controller 156, thus supplying the constant voltage feeding current to the travelling object 82 and thereby bringing it into the cruising speed operation.

In this condition, let consider the section immediately following the section occupied by the travelling object 82, namely, the section located between the section controllers 156 and 158. The current relay coil 68 of the section controller 156 is energized by the feeding current supplied to the travelling object 82 and the contacts 76 are opened. With the contacts 76 now open, no voltage is applied to the trolley wire 48 so that when a travelling object enters the section of the trolley wires 38 and 48, the dynamic braking of the travelling object is effected and it is even stopped, if necessary. Although the contacts 120 are being closed by the energization of the voltage relay coil 128 in the section controller 156, the contacts 76 are open thus applying no voltage to the trolley wire 48.

On the other hand, considering the section controller 158, the trolley wire 38 is occupied by no travelling object so that the current relay coil 70 is deenergized and the contacts 78 are closed. Also, since no voltage is applied to the trolley wire 48 so that the voltage relay coil 130 is deenergized and the contacts 122 are opened, the DC constant voltage is applied to the trolley wire 50 from the positive feeder line 10 through the contacts 78 and the resistor 115. Also the DC constant voltage is applied to the trolley wire 40 from the positive feeder line 10 through the current relay coil 72 of the section controller 160.

When the following travelling object 82' proceeds to the trolley wires 40 and 50 as shown in the Figure, a voltage drop is caused across the resistor 115 of the controller 158 by the feeding current flowing from the trolley wire 50 to an armature coil 86' of the travelling object 82', so that the applied voltage to the trolley wire 50 is reduced to the predetermined low voltage. As a result, the travelling object 82' is decelerated to the speed determined by the value of the resistor 115. In other words, the power control is accomplished in which the section between the section controllers 158 and 160 or the section which is next but one to the preceding section occupied by the travelling object 82 is turned into a slow speed section.

With the circuit construction described above, the control system of the invention for controlling the operation of travelling objects through the power control is so designed that without providing any conventional signal system but using only power control circuitry, not only travelling objects can be controlled to decelerate, but also the section following the braking and stopping section can be turned into a slow speed section, thus preventing sudden deceleration of travelling objects, ensuring improved riding confortability, preventing the application of the voltage to the section preceding the slow speed section to thereby positively stop the following travelling object even in the event of sudden stopping of the preceding travelling object, reducing the occurrence of breakdown of travelling objects due to rapid acceleration and deceleration and increasing the life of travelling objects. Moreover, the privision of the slow speed section has the effect of positively stopping a travelling object within the block section without increasing the length of the block sections or mounting any specially designed brake system on travelling objects.

Figure 3:
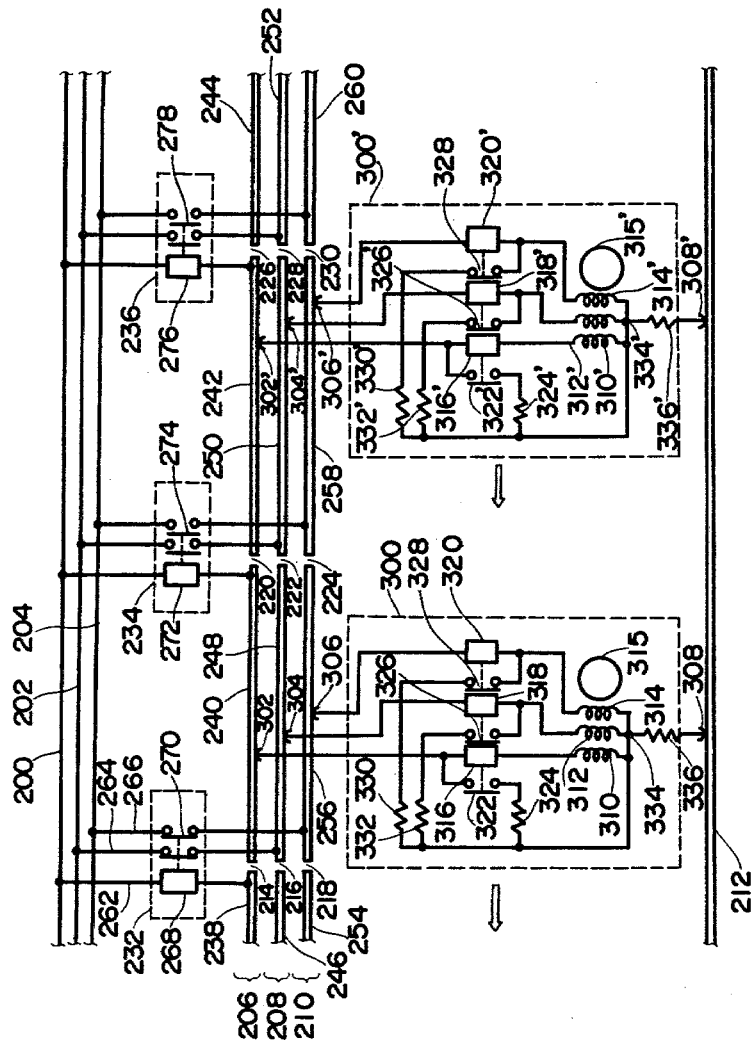
FIG. 3 is a circuit diagram showing the feeder circuit and travelling object motor circuits used in another embodiment of the invention which is designed to effect the power control of three-phase AC feeding.

Referring now to FIG. 3, there is illustrated still another embodiment of the control system of this invention for controlling the operation of travelling objects through the power control, which is designed to accomplish the automatic control of travelling objects having induction motors in the motor circuit only through the power control by three-phase AC feeding control.

In the Figure, a feeder circuit includes, installed along a track, three-phase AC feeder lines 200, 202 and 204, AC feeding trolley wires 206, 208 and 210 and a neutral trolley wire 212. The trolley wires 206, 208 and 210 are respectively electrically divided and insulated by suitable sectioning devices, e.g., air gaps 214, 216 . . ., 230 into sections each thereof constituting a predetermined block section. Section controllers 232, 234 and 236 are provided for the respective block sections. The section controllers 232, 234 and 236 connect the feeder lines 200, 202 and 204 to the trolley wires 206, 208 and 210. Taking the section controller 232 as an example, a current relay coil 268 is inserted and connected in a branch line 262 which in turn connects the feeder line 200 to a sectionalized trolley wire 238, and normally closed contacts 270 for two circuits which are operated by the current relay coil 268, are inserted and connected in branch lines 264 and 266 which connect the feeder lines 202 and 204 to sectionalized trolley wires 248 and 256. When the feeding current flows in the trolley wire 238 of the preceding block section, the current relay coil 268 is energized and the contacts 270 are opened. With the contacts 270 open, the voltage is no longer applied to the following block section trolley wires 248 and 256. The same circuit connections as the above-described section controller 232 are used for the other section controllers 234 and 236.

Next, the motor circuit of a travelling object 300 will be described as an example of the travelling object motor circuits. The motor circuit includes current collectors 302, 304, 306 and 308 for collecting the current from the trolley wires 206, 208 and 210 and the neutral trolley wire 212, respectively. Current relay coils 316, 318 and 320 are respectively inserted and connected between the current collectors 302, 304 and 306 and field coils 310, 312 and 314 which are respectively connected to the current collectors 302, 304 and 306 and adapted to rotate a rotor 315 of the three-phase induction motor, and each of the current relay coils is so designed that each coil is energized by the voltage applied from the trolley wire, while the coil is deenergized when no voltage is applied thereto from the trolley wire. The current relay coil 316 has its normally closed contacts 322 inserted in the branch line coming out from the current collector side and leading to the current collector 308 through a resistor 324, and the current relay coils 318 and 320 have their normally closed contacts 326 and 328 respectively inserted in the branch lines respectively coming out from the field coil side of the current relay coils 318 and 320 and leading to the current collector 308 through resistors 330 and 332, respectively.

When no voltage is applied to the trolley wires 208 and 210, respectively, the current relay coils 318 and 320 are deenergized so that their contacts 326 and 328 are closed and the resistors 330 and 332 are inserted as the loads of the field coils 312 and 314, thus effecting the dynamic braking.

The resistor 324 serves as a protective resistor so that when the field coil 310 is broken, the resistor 324 maintains the flow of the feeding current from the trolley wire 206 which is always supplied with the power. In other words, when the field coil 310 is broken, the current relay coil 316 is deenergized and the contacts 322 are closed. Consequently, the resistor 324 is inserted thus flowing the feeding current which will normally be supplied from the trolley wire 206 by the presence of a travelling object and thereby allowing the energization of the current relay coil of the section controller. For this purpose, the AC impedance of the resistor 324 must be made equal to that of the field coil 310.

The induction motor mounted on the travelling object 300 should most preferably be a three-phase induction motor having field coils connected in a star configuration. A common connecting point or neutral point 334 of the star-connected field coils 310, 312 and 314 is connected through a desired braking load 336 to the current collector 308 and then to the neutral trolley wire 212. The current which will flow to the braking load 336 from the neutral point 334 is a unbalance current which flows to the field coil 310 from the continuously supplied trolley wire 206 when no voltage is applied to the trolley wires 208 and 210. Thus, the unbalance current flowing in the braking load 336 may be utilized to actuate braking means, such as, hydraulic brakes, disk brakes, magnetic brakes or the like. The actuation of the brakes by this unbalance current is operable even if the travelling object 300 is at rest.

The following travelling object 300' has the same circuit connections as the travelling object 300 and therefore its component parts are designated by the same reference numerals but with a prime.

The operation of this embodiment through the AC power control will now be described. Assume now that the travelling object 300 is present in the section between the section controllers 232 and 234 and no other travelling object is present in the preceding section in the direction of the movement of the travelling object 300. Consequently, no feeding current flows in the trolley wire 238 so that the current relay coil 268 of the section controller 232 is not energized and the contacts 270 remain closed, thus supplying the AC feeding current to the trolley wires 248 and 256.

On the other hand, a current relay coil 272 of the section controller 234 is energized by the feeding current flowing to the travelling object 300 by way of a trolley wire 240, so that its contacts 274 are opened and the voltage is no longer applied to trolley wires 250 and 258 located in the section immediately following the section where the travelling object 300 is present.

In this case, the motor circuit of the travelling object 300 operates as follows. The field coils 310, 312 and 314 of the three-phase induction motor are supplied with the AC feeding current from the trolley wire 240, 248 and 256, so that the rotor 315 is rotated and the travelling object 300 is brought into the cruising speed operation. At that time, the current relay coils 316, 318 and 320 are all energized and their contacts 322, 326 and 328 are all opened, thus supplying no unbalance current to the braking load 336 from the neutral point 334.

Assume now that in this condition the following travelling object 300' proceeds into the section between the section controllers 234 and 236 which immediately follows the section occupied by the travelling object 300. Since there is no applied voltage to the trolley wires 250 and 258 as mentioned previously, current relay coils 318' and 320' of the travelling object 300' are deenergized so that their contacts 326' and 328' are closed and resistors 330' and 332' are connected to field coils 312' and 314', respectively, thus effecting the dynamic braking. At the same time, the unbalance current flowing in a field coil 310' by the voltage from the trolley wire 242 now flows to the newtral trolley wire 212 through a braking load 336'. Consequently, the desired braking means is actuated to decelerate the travelling object 300', and the travelling object 300' is stopped, if necessary.

When the preceding travelling object 300 passes through the section between the section controllers 232 and 234 while the travelling object 300' is being decelerated or after it has been brought to a stop, the current relay coil 272 of the section controller 234 is deenergized so that its contacts 274 are closed and the AC voltage is applied to the trolley wires 250 and 258. Consequently, the current relay coils 318' and 320' of the travelling object 300' are energized and their contacts 326' and 328' are opened, thus releasing the dynamic braking and thereby accelerating the travelling object 300' to the cruising speed.

It will thus be seen that in accordance with this embodiment, the desired automatic control of the operation of travelling objects can be accomplished only through the power control which controls the three-phase AC power supply to the three-phase induction motors mounted on the travelling objects, and particularly the braking control of the travelling objects can be accomplished through the combined use of the dynamic braking utilizing the features of the three-phase induction motor and any desired braking means operated by unbalance current, thus accomplishing only through the power control of the three-phase AC power any desired running conditions of the travelling objects, e.g., the constant speed operation, deceleration and stopping, acceleration, etc.

Figure 4:
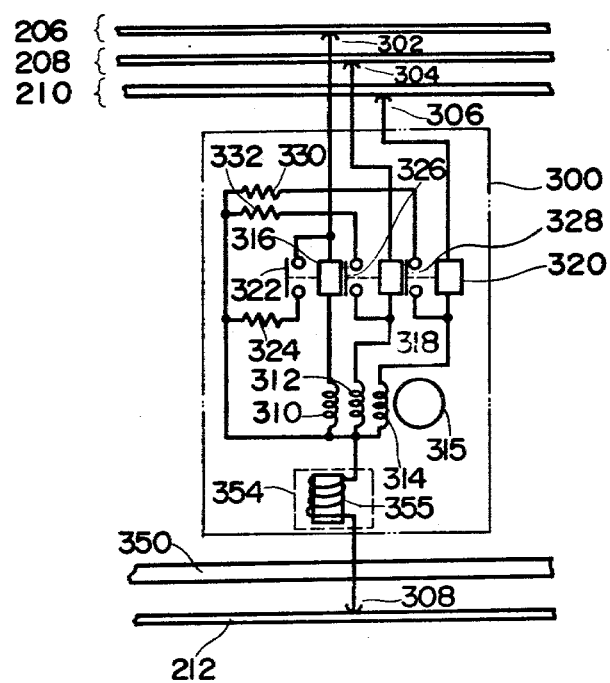
FIG. 4 is a circuit diagram showing a travelling object motor circuit designed so that the current flowing in the neutral trolley wire is utilized to energize and cause an electromagnet to effect the magnetic braking in cooperation with a magnetic plate or electrically conductive plate.

FIG. 4 shows another embodiment of the travelling object motor circuit in which a magnet unit 354 with an exciting coil 355 is provided in place of the dynamic braking load 336 of the travelling object 300 shown in FIG. 3. A plate 350 is installed on the ground to cooperate with the magnet unit 354. The plate 350 is made of a magnetic material or electrically conductive material. If the plate 350 is made of magnetic material, the desired braking will be effected by the magnetic force produced between the plate 350 and the magnet unit 354. If the plate 350 is made of electrically conductive material, the braking will be effected by the eddy current produced between the plate 350 and the magnet unit 354. The control of operation of the travelling object 300 equipped with the magnet unit 354 will be described in greater detail later.

Referring now to FIGS. 5 and 6, there is shown still another embodiment of the invention including means and a feeder circuit designed for automatically stopping a travelling object at a predetermined fixed position with a high degree of accuracy through the power control of three-phase AC feeding.

In FIG. 5, arrows 340 and 342 define therebetween a block section, and an arrow 340 indicates a predetermined stop position for travelling object. In this case, the stop position should preferably be different from the break between the block sections. Magnetic belt units 344 and 346 are arranged within the block section with a predetermined spacing therebetween. Each of the magnetic belt units 344 and 346 has a belt member made of a magnetic material and adapted to be rotated circularly. Disposed on the exit side of the magnetic belt unit 344 is a plate 350 made of a magnetic material or electrically conductive material and covering the stop position 340.

On the other hand, a magnet unit 354 is mounted on a travelling object 300 to produce a magnetic force between the magnet unit 354 and the magnetic belt units 346 and 344 when the travelling object 300 passes over the magnetic belt units 346 and 344. The magnetic unit 354 employs an electromagnet or permanent magnet.

Each of the magnetic belt units 346 and 344 is designed so that its upper belt surface is rotated at a predetermined speed in the direction of movement of the travelling object shown by an arrow 548. Consequently, when the travelling object 300 proceeds onto the magnetic belt units 346 and 344, respectively, the speed of the travelling object is synchronized with the rotation speed of the magnetic belt by the magnetic force produced between the magnet unit 354 on the travelling object and the magnetic belt units 346 and 344, respectively.

When the travelling object 300 thus synchronized with the magnetic belt units 346 and 344 proceeds onto the plate 350, if the plate 350 is made of magnetic material, the magnetic braking is effected by the magnetic force produced between the plate 350 and the magnetic unit 354 on the travelling object thus stopping it, whereas if the plate 350 is electrically conductive material, an eddy current is induced in the plate 350 by the magnetic flux of the magnet unit 354 to the plate 350, and the reaction of the electromagnetic induction due to the eddy current applies a dragging force to the travelling object 300 to bring it to a stop.

FIG. 6 shows a three-phase AC feeder circuit illustrated to positionally correspond with the units shown in FIG. 5, which is identical with the circuit construction for the section between the section controllers 232 and 234 in FIG. 3, and therefore the like parts are designated by the like reference numerals. The travelling object is also identical with that shown in FIG. 4, and therefore its circuit connections will not be described. Only difference is that stop actuation contacts 356 are inserted in the branch lines 264 and 266 of the section controller 232. The contacts 356 are so designed that the contacts are opened to stop the travelling object entering this block section, while the contacts are closed to restart the travelling object which has been stopped.

The operation of this embodiment will now be described with reference to FIGS. 5 and 6. In FIG. 5, when the travelling object 300 enters the block section at the position of the arrow 342, the travelling object 300 is decelerated by the dynamic braking due to the fact that the contacts 356 are open and no voltage is applied to the trolley wires 246 and 256 in FIG. 6.

Assume now that the magnetic belt unit 346 is rotating at a speed $v_1$ and the magnetic belt unit 344 is rotating at a speed $v_2$ and that $v_1 > v_2$. It is also assumed that the travelling object 300 is so designed that in response to the dynamic braking, the magnet unit 354 employing an electromagnet is energized by the unbalance current supplied from the field coil of the three-phase induction motor on the travelling object.

With these conditions, when the travelling object 300 proceeds to the position of the magnetic belt unit 346, the travelling object 300 is synchronously decelerated to the magnetic belt speed $v_1$ by the magnetic force between the magnet unit 354 and the magnetic belt unit 346 while the travelling object 300 is moving past the magnetic belt unit 346.

Thereafter, when the travelling object 300 is again decelerated by the dynamic braking and proceeds to the position of the magnetic belt unit 344, the travelling object 300 is synchronously decelerated and consequently its speed is synchronized with the magnetic belt speed $v_2$ as the travelling object 300 moves past the magnetic belt unit 344.

After leaving the magnetic belt unit 344, the travelling object 300 proceeds to the plate 350 so that if the plate 350 is made of magnetic material, the magnetic brakes are applied, whereas if the plate 350 is made of non-magnetic good conductor, an eddy current braking force is applied, thus stopping the travelling object 300 at the fixed position indicated by the arrow 340.

This stopping operation will be described in greater detail with reference to the graph of FIG. 7. The graph of FIG. 7 is a speed graph in which the ordinate represents the speed v meter/second of the travelling object 300, and the abscissa represents the distance L meter, the arrow 342 designates the entering end of the block section where the travelling object has a speed $v_p$, and the arrow 340 designates the stop position. A straight speed line 400 of $v_1$ represents the rotation speed of the magnetic belt unit 346, a straight speed line 500 of $v_2$ represents the rotation speed of the magnetic belt unit 344, and it is assumed by way of example that $v_p = 15$ meter/second [54 kilometer/hour], $v_1 = 10$ meter/second [36 kilometer/hour] and $v_2 = 0.5$ meter/second [1.8 kilometer/hour].

Consider first the case where the weight of the travelling object is relatively low as in the case of an empty car carrying no passengers or cargos or the case where the running resistance is large. When the travelling object which has been decelerated by the dynamic braking at a point 360 reaches a point 365, the magnetic force between the travelling object and the magnetic belt unit 346 causes the travelling object to follow and move in synchronism with the magnetic belt speed $v_1$. Then, as the travelling object moves past the magnetic belt unit 346 at a point 370, the travelling object is again decelerated by the dynamic braking so that the travelling object is caused by the magnetic force between it and the magnetic belt unit 344 to follow and move in synchronism with the magnetic belt speed $v_2$, and after leaving a point 380 the travelling object is stopped at the stop position 340 by the braking action between it and the plate 350.

On the other hand, where the weight of the travelling object is relatively large or the running track is wet and hence the running resistance is low, the travelling object is subjected to the dynamic braking at the point 360, moved at a point 385 to the magnetic belt unit 346 where it is braked by the magnetic belt by virtue of the magnetic force between it and the magnetic belt unit 346 to increase the deceleration gradient, synchronised with the speed $v_1$ of the magnetic belt unit 346 at the point 370, again subjected to the dynamic braking and moved at a point 390 to the magnetic belt unit 344 where it is subjected to the magnetic braking to increase the deceleration gradient, synchronized with the speed $v_2$ of the magnetic belt unit 344 at the point 380, and then stopped at the stop position 340 by the braking force between it and the plate 350.

If the fixed position stopping system of this invention is not employed and a travelling object is simply decelerated, depending on the weight of the travelling object, the travelling object will be stopped at a point 395 or 396 which is considerably deviated from the predetermined stop position.

Thus, in accordance with the fixed position stopping system of this invention, irrespective of the variation in the weight of a travelling object or the variation of the road surface friction, the travelling object can be stopped at a predetermined fixed position with a high degree of accuracy, and the invention has a great advantage of accomplishing the automatic fixed position stop control without using any special travelling object detecting means or signal control system.

Further, the spacing and rotation speed of the magnetic belt units used in the fixed position stop system of this invention should be suitably determined in accordance with the various running conditions of travelling objects.

While, in the embodiment described above, the travelling object is synchronously decelerated by two units of the magnetic belt, the number of magnetic belt units and the length of the belts or the block section length may be suitably determined in accordance with the specifications of a desired system.

With the above-described stop control of this invention, a travelling object can be synchronously decelerated by the magnetic force produced between the travelling object and the magnetic belt units, with the result that the speed control of the travelling object can be accurately effected until the travelling object reaches a fixed stopping position without being affected by any variation in the weight of the travelling object or the running resistance, e.g., the track surface conditions. Further, the use of the magnetic braking after the synchronous deceleration by the magnetic belt, has the effect of further improving the stopping accuracy. Still further, since the synchronous deceleration by the magnetic belts utilizes magnetic force, the travelling object can proceed to and move past the magnetic belts smoothly, thus preventing any sudden change in the acceleration and thereby ensuring improved riding confortability. Still further, by virtue of the fact that the magnetic belts and plate and the travelling object magnet unit are operable in contact or noncontact manner with each other, the use of the fixed point stopping system of this invention has no danger of producing noise and vibration and causing mechanical wear and tear to the equipment and installations. In addition, this fixed position stop control can be incorporated as such in the control system of this invention for controlling the operation of travelling objects through the power control of DC constant voltage feeding.

It will thus be seen from the foregoing description that in accordance with the control system of this invention for controlling the operation of travelling objects through power control, the automatic operation of travelling objects can be accomplished by simply switching on and off the feeding voltage without requiring any specially designed separate control circuits, means for detecting for example the location of the travelling objects or separate operation order control means for providing any desired operation pattern, etc., and this has the effect of achieving considerable simplification of the equipment on the ground as well as the equipment on the travelling objects and greatly reducing the equipment cost as compared with the prior art automatic train operation systems. Still further, the simplified construction of the equipment and installations has the effect of sufficiently reducing the failure rate, making it possible to adapt the important feeding equipment and apparatus for a parallel change-over system to ensure a high degree of redundancy which permits a restoration in a very short period of time in the event of a failure or the like, and ensuring the maintenance of the continuous automatic operation of travelling objects.

What is claimed is:

1. An improved control system apparatus for controlling the operation of travelling objects through the power control of DC constant voltage feeding, employing feeding means disposed along a track for applying a DC constant voltage to first and second trolley wires, said first trolley wire having a plurality of means for insulating and sectioning disposed at intervals along a predetermined block section, being adapted to maintain continuous constant voltage feed, said second trolley wire having a plurality of insulating and sectioning means disposed at intervals along said predetermined block section, being responsive to feeding control by on-off switch means for control of the constant voltage feeding, and a negative feeder line consisting of a trolley wire; said improvement comprising: providing section control means for each of said block sections defined by said means for insulating and sectionalizing said first and second trolley wires respectively, to connect said feeding means to a section of said first trolley wire and to a section of said second trolley wire defined by the block section behind said first trolley wire section, said section control means being adapted to apply said voltage to said first trolley wire section in a direction of movement of travelling objects in the presence of an object load on said first trolley wire section to thereby block the blocking section with which said trolley wire section is associated; and DC motor means disposed on each of said travelling objects to impart motion thereto, by collecting power from said trolley wires, said DC motor means is supplied with current collected from said first trolley wire, and an armature coil of said DC motor is supplied with power collected from said second trolley wire, whereby each travelling object is caused to have a constant speed operation in that block section where said voltage is simultaneously applied to said first and second trolley wires, and brake means for detecting non-application of said voltage to said second trolley wire being adapted to apply a braking force to cause said travelling object to stop within said block section, when each travelling object enters that block section where said voltage is not applied to said second trolley wire.

2. A control system apparatus according to claim 1, wherein: each of said section control means comprises, a current relay coil inserted in a connecting line, connecting said feeding means to said first trolley wire section, said current relay coil being energized by feeding current supplied to a travelling object load; and normally closed contacts, inserted in another connecting line connecting said feeding means to said second trolley wire section, said normally closed contacts being disposed to be opened in response to the energization of said current relay coil.

3. A control system apparatus according to claim 2, wherein: each of said section control means further comprises, a voltage dropping resistor connected in series with said normally closed contacts adapted to provide a feeding voltage corresponding to an operational travelling object speed; a voltage relay coil energizable by an applied voltage of said second trolley wire section immediately preceding, in said direction of movement and said second trolley wire section being connected to said normally closed contacts; said voltage relay coil being adapted to be deenergized in response to the absence of said applied voltage, and normally open contacts connected in parallel with said resistor being responsive to said voltage relay coil.

4. A control system apparatus according to claim 1, further comprising: a voltage relay coil responsive to the absence of voltage to said second trolley wire, and normally closed contacts, whereby deenergization of said voltage relay coil causes dynamic braking through load resistors connected to the armature coil of said DC motor.

5. An improved control system apparatus for controlling the operation of travelling objects through a three-phase AC feed, power control comprising: three trolley wires for three-phase AC feeding and a neutral trolley wire arranged along a track, each of said three feeding trolley wires having a plurality of insulating sectioning means disposed at intervals of a predetermined block section, said improvement comprising: providing section control means for each of said block sections whereby, one of said three-phase AC feed trolley wires being energized, and said remaining two wires being subjected to feed control in response to feed current supplied in response to movement of said travelling objects; and each of said travelling objects being provided with a three-phase induction motor whereby current from said feeding trolley wires energizes a motor circuit for controlling the operation of each said travelling object in response to the AC current supplied from said two trolley wires subjected to feed control.

6. A control system apparatus according to claim 5, wherein: each of said section control means comprises a current relay coil inserted in a connecting line disposed to receive current from one of said three-phase AC power feed wires and being connected to said block section trolley wire for energization, said current relay coil being operable in response to the feeding current to a travelling object, and normally closed contacts disposed in each of two connecting lines respectively being connected to two feed control trolley wires of a block section immediately following the block section of said section control means, said normally closed contacts being adapted to open in response to the energization of said current relay coil.

7. A control system apparatus according to claim 5, wherein: the motor circuit of each travelling object includes, a three-phase induction motor having a star field coil connection, a current relay coil connected in series with each of the field coils of said induction motor, relay contacts being provided for each said field coils to switch each of said field coils to a dynamic braking operation in the absence of voltage to each of said current relay coils, and a desired braking control load disposed in a connecting path leading from a neutral point of said field coils to said neutral trolley wire.

8. A control system apparatus according to claim 5, wherein: magnetic braking plate is disposed at a stopping position, at least one conveyor belt is provided on the entry side of said stopping position, said conveyor belt having a magnetic belt adapted to be rotated at a desired speed and to synchronously deaccelerate a travelling object by magnetic force, and magnet means is mounted on each travelling object to form a magnetic circuit when said magnet means is opposite to said magnetic belt, whereby each of said travelling objects is automatically stopped at a designated stopping position.

* * * * *